(12) United States Patent
Svensson et al.

(10) Patent No.: US 6,467,178 B1
(45) Date of Patent: Oct. 22, 2002

(54) METHOD AND APPARATUS FOR BEAM TOOL CENTER POINT CALIBRATION

(75) Inventors: Tommy Svensson, Fort Collins, CO (US); Christian Poljen, Uddevalla (SE)

(73) Assignee: ABB Automation Inc., New Berlin, WI (US)

( * ) Notice: Subject to any disclaimer, the term of this patent is extended or adjusted under 35 U.S.C. 154(b) by 64 days.

(21) Appl. No.: 09/658,726

(22) Filed: Sep. 11, 2000

(51) Int. Cl.[7] .............................................. G01B 11/00
(52) U.S. Cl. ........................... 33/286; 33/644; 356/621; 356/400
(58) Field of Search .......................... 33/286, 227, 228, 33/502, 520, 613, 644, 645, 666, 670, 671, 556, 559, DIG. 3; 356/614, 621, 399, 400, 401

(56) References Cited

U.S. PATENT DOCUMENTS

| | | | |
|---|---|---|---|
| 5,251,156 A | * 10/1993 | Heier et al. | 33/559 |
| 5,457,367 A | 10/1995 | Torne | 318/568.11 |
| 5,675,229 A | 10/1997 | Thorne | 318/568.11 |
| 5,718,054 A | * 2/1998 | Kitajima | 33/227 |
| 5,813,128 A | * 9/1998 | Bailey | 33/502 |
| 5,910,719 A | 6/1999 | Thorne | 318/560 |
| 6,175,413 B1 | * 1/2001 | Lucas | 356/614 |

* cited by examiner

*Primary Examiner*—Christopher W. Fulton
(74) *Attorney, Agent, or Firm*—Harness, Dickey & Pierce, P.L.C.

(57) ABSTRACT

A method and system for determining a tool center point (TCP) for a beam tool involves the use of a specially design aperture and light sensing device. The method and system oscillates the beam tool across an aperture assembly such that light from the tool periodically passes through the aperture assembly. Center point coordinate information is then determined based on passage of light through the aperture assembly. The method and system further provides for calculating the TCP based on the center point coordinate information.

17 Claims, 5 Drawing Sheets

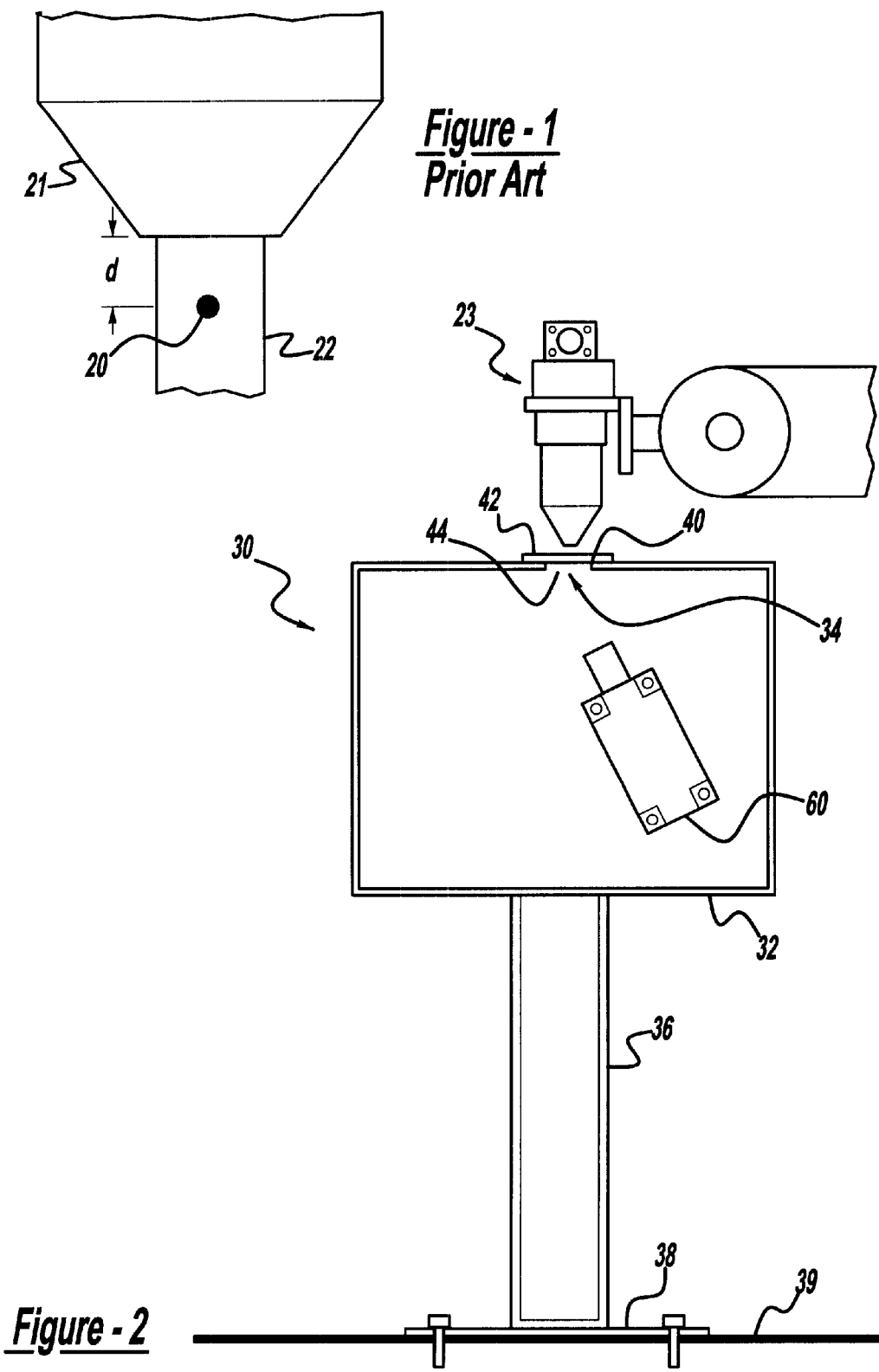

METHOD AND APPARATUS FOR BEAM TOOL CENTER POINT CALIBRATION

FIELD OF THE INVENTION

The present invention generally relates to tool center point calibration systems. More particularly, the invention relates to a method and system for automatically determining a tool center point for a beam tool.

BACKGROUND ART

In the automotive industry, a common activity is the removal of material from various internal and external parts to create various holes and shapes. Conventional approaches to this activity have involved casting sections of the part, punching the unwanted material out of the sections, and subsequently welding the sections together. This approach, however, has its drawbacks. For example, the additional welding step can be quite expensive and time consuming. Furthermore, the casting of sections as opposed to complete parts, increases overall manufacturing costs.

In response to the above and other difficulties associated with the "punch and weld" approach, laser cutting has rapidly evolved. The result is that now complete parts can be fabricated and then the unwanted material can be removed with a laser cutting tool. While this approach has resulted in significant cost savings and benefits, there is still room for improvement. For example, the typical laser cutting tool has a tool center point (TCP) that is typically defined by the laser manufacturer. The TCP is generally measured from the robot's tool mounting plate and will often have an accuracy on the order of tens of millimeters. In order for laser cutting to serve as a legitimate alternative to the punch and weld approach, the robot handling the laser head must be able to position the TCP at very precise locations. Thus, the robot controller must know exactly where the TCP is at all times.

Typical approaches to determining the TCP for conventional tools involve a well known process of repeatedly moving the TCP to a fixed point with various tool orientations and taking orientation readings. From these readings, the robot controller can determine the TCP. The difficulty with this approach, however, is that a significant amount of time and effort is required to manually jog the TCP to the fixed point in order to take the coordinate readings. In fact, it is extremely difficult to get the required accuracy when performing this type of calibration.

Furthermore, the "manual jog" approach is best suited for tools with a physical TCP (i.e. "touching" tools). In other words, beam cutting tools have a TCP that is located somewhere in the center of it's beam, and is therefore not visible in the physical TCP sense. Thus, the calibration technician cannot precisely know when the TCP has reached the fixed point during the calibration procedure. Another difficulty is that the nozzle of the laser head can be of many different designs, making it difficult to use any type of "beam breaking" device (as in the conventional bull's-eye) to determine the TCP. It is therefore desirable to provide a method and system for determining a TCP for a laser cutting tool that does not fall subject to the aforementioned difficulties. It is also desirable to provide a solution that is cost efficient, automatic, and self-adjusting.

SUMMARY OF THE INVENTION

In a first aspect of the invention, a method for determining a tool center point (TCP) for a beam cutting tool is provided. The method includes the step of oscillating the tool across an aperture assembly such that light from the tool periodically passes through the aperture assembly. Center point coordinate information is then determined based on passage of the light through the aperture assembly. The method further provides for calculating the TCP based on the center point coordinate information. Preferably, these steps are repeated for a plurality of tool orientations. Passing the light through the aperture assembly in a controlled fashion enables the TCP to be determined without skilled labor, manual processes, or significant expense.

In a second aspect of the invention, a TCP calibration system is provided. The calibration system includes an aperture assembly having an aperture for allowing light from a beam cutting tool to create an image inside the aperture assembly. The calibration system further includes a light sensing device for capturing an image created on the aperture assembly. The light sensing device generates a signal corresponding to the light intensity emitted from the aperture assembly.

BRIEF DESCRIPTION OF THE DRAWINGS

The invention is set forth in exemplary fashion by the following detailed description of a preferred embodiment taken in conjunction with the drawings, in which:

FIG. 1 is a side view of a prior art nozzle for a laser cutting tool useful in understanding the present invention;

FIG. 2 is a side view of a TCP calibration system in accordance with the principles of the present invention;

DETAILED DESCRIPTION OF THE PREFERRED EMBODIMENTS

Figure 3:
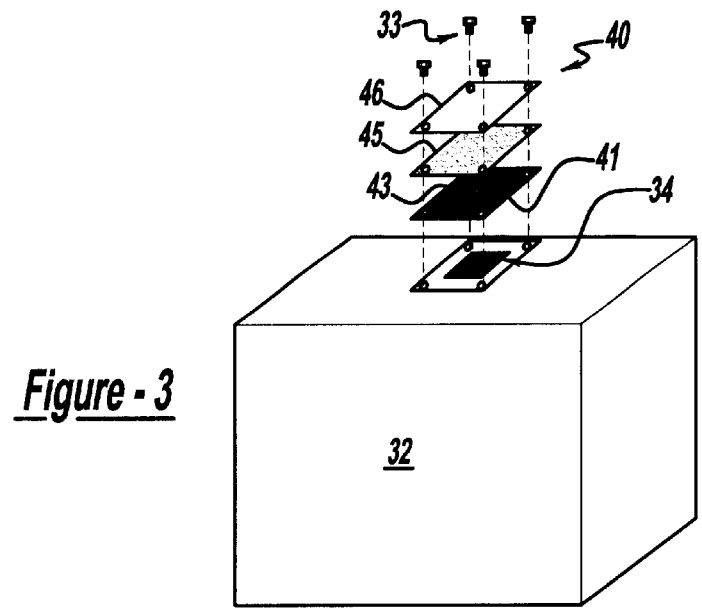
FIG. 3 is an exploded isometric view of an aperture assembly in accordance with the principles of the invention.

Turning now to FIG. 1, an actual tool center point (TCP) 20 for a laser cutting tool nozzle 21 producing a beam 22 is shown. It is important to note that the TCP 20 is typically defined to be located in the center of the laser beam 22 at a distance "d" from the end of the nozzle 21. Thus, manually moving the TCP 20 to a fixed point in space is not a desirable calibration solution.

FIG. 2 shows a TPC calibration system 30 capable of enabling determination of a TPC for a laser cutting tool 23. Generally, the calibration system 30 has an aperture assembly 40 and a light sensing device such as a digital camera 60. It is preferred that the calibration system 30 has a housing 32 for enclosing the digital camera 60, where the housing 32 has an opening 34. The housing 32 is preferably mounted on a stand 36 and baseplate 38 for attachment of the calibration system 30 to a floor surface 39. The aperture assembly 40 has an aperture (to be discussed below) for allowing light from the tool 23 to pass from a first side 42 of the aperture assembly 40 to a second side 44 of the aperture assembly 40. The digital camera 60 captures an image of the second side 44, and generates a signal corresponding to passage of the light to the second side 44. It is important to note that while the digital camera 60 provides the preferred functionality for this purpose, any type of light sensing device may be used without parting from the spirit and scope of the invention.

Turning now to FIG. 3, one embodiment of the aperture assembly 40 is shown in greater detail. Specifically, a first layer 41 contains an aperture 43. A second layer 45 is disposed between the first layer 41 and the beam cutting tool 23 (FIG. 2). The second layer 45 is preferably a thin layer of semi-transparent material used to capture an image of the laser beam. It is important to note that the second layer 45 allows enough intensity through to the second side 44 so that the digital camera 60 can detect the beam. A protective layer of film 46 is disposed between the second layer 45 and the tool such that the film 46 provides protection to the second layer 45. The first layer 41 is preferably made of sheet metal and is bolted to the housing 32 with a connection mechanism 33.

Figure 4:
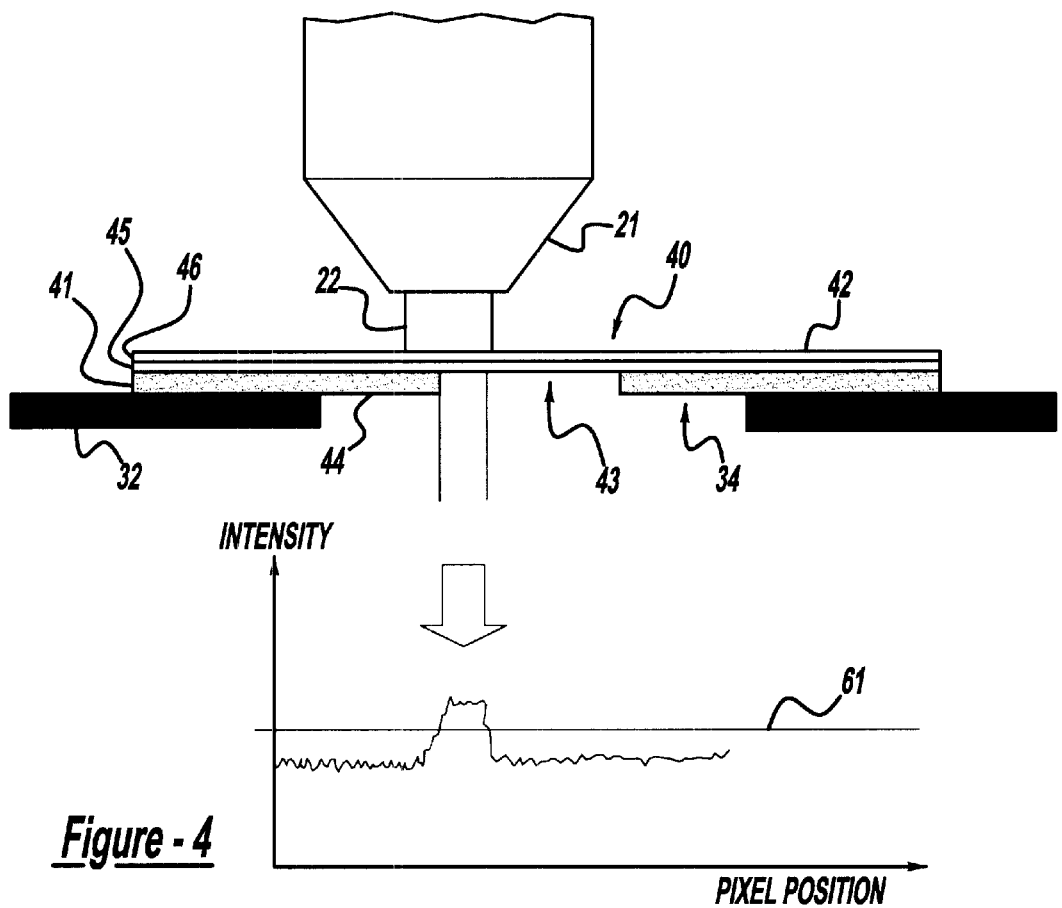
FIG. 4 is a side view of an aperture assembly in relation to a nozzle of a beam cutting tool showing a resulting intensiting signal detected by a light sensing device in accordance with the principles of the invention.

FIG. 4 demonstrates the capture of images from the second side 44 of the aperture assembly 40 by the digital camera 60. It can be seen that since the digital camera 60 is pointed toward the aperture 43 in the first layer 41, an intensity image can be detected.

Every time the laser beam 22 passes the aperture 43, an image appears on the backside of the second layer 45. This image is detected by the digital camera 60 by virtue of the increase in light intensity caused by the laser light. When the light intensity reaches a predetermined trigger level 61 or matches certain criteria, an output signal is generated by the camera 60 to notify the robot controller that the beam 22 has reached the aperture 43. As will be discussed below, this output signal can either be an initialization signal associated with the preferred set-up procedure, or a centerpoint signal associated with the actual calibration procedure.

Figure 5:
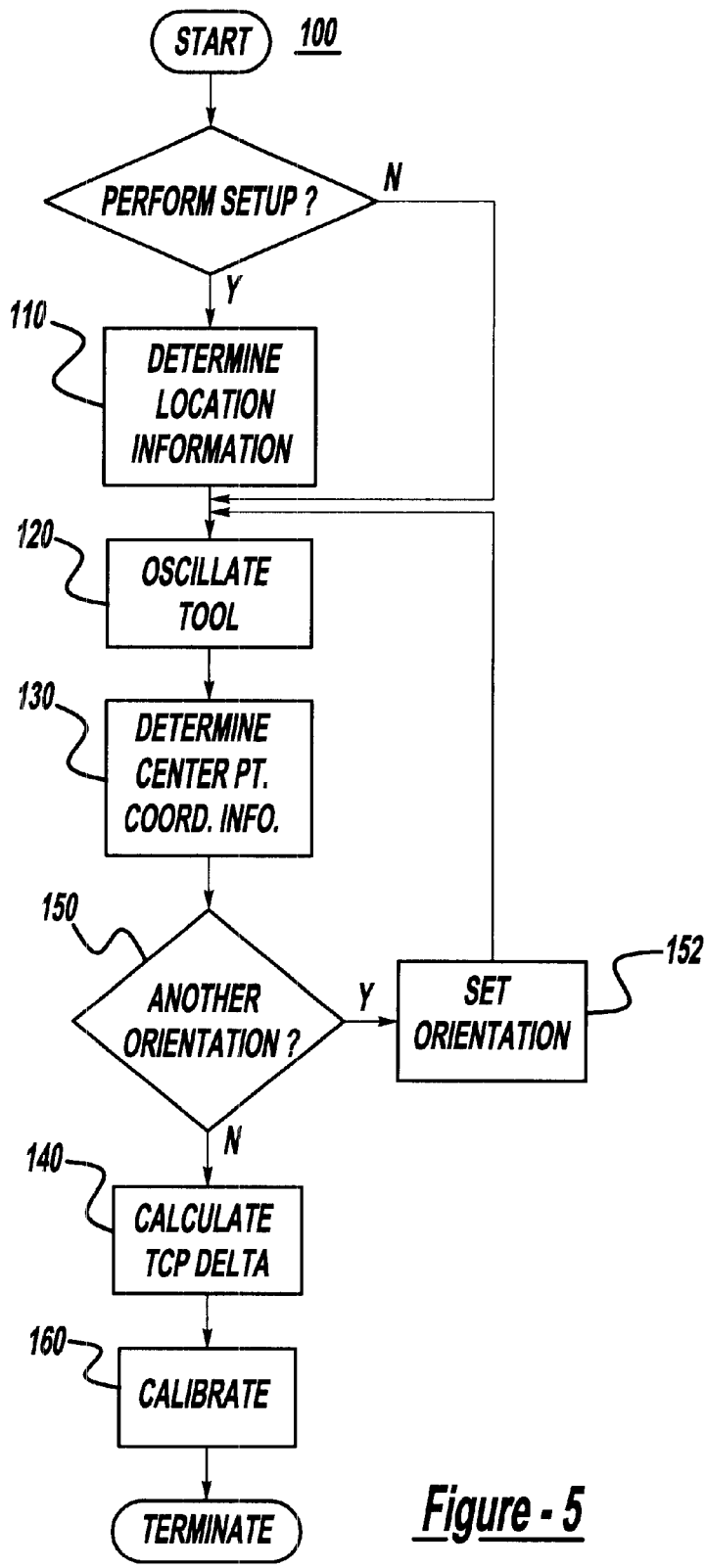
FIG. 5 is a flowchart of a method for determining a TCP for a beam cutting tool in accordance with the principles of the invention.

Turning now to FIG. 5, the preferred method for determining a TCP for a laser cutting tool is shown at 100. It can be seen that location information regarding the aperture assembly is automatically determined at step 110. This involves both locating a plane containing the aperture assembly, and determining an orientation of the aperture contained within the aperture assembly.

Figure 6:
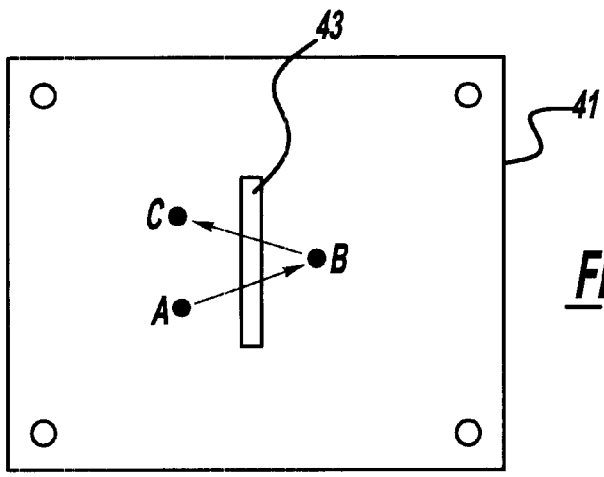
FIG. 6 is a plan view of an aperture demonstrating a process for automatically locating a plane containing the aperture assembly in accordance with the principles of the invention.

FIG. 6 demonstrates the preferred approach to locating the plane containing the aperture assembly 40 (FIG. 3). In FIG. 6 and those following, only the first layer 41 of the aperture assembly 40 is shown for ease of discussion. It will generally be appreciated that locating the plane containing the aperture assembly 40 also provides information regarding the orientation of the housing 32 (FIG. 3) in the robot's base coordinate system. Specifically, this is done by locating three points (A, B, C) in the plane containing the aperture assembly. When measuring points A, B and C, the well known capacitive height-sensing functionality of the laser cutting tool is used. Thus, the robot controller is able to know when the nozzle of the tool is the predetermined distance d from the aperture assembly 40. Calculating the plane based on points A, B and C allows the laser cutting tool to be positioned perpendicularly to the plane.

Figure 7:
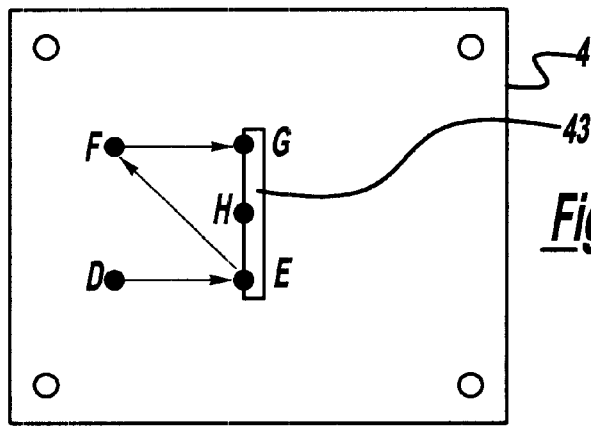
FIG. 7 is a plan view of an aperture demonstrating a process for automatically determining an orientation of the aperture contained within the aperture assembly in accordance with the principles of the invention.

Once the plane in space is determined and the tool is positioned perpendicularly to the plane, the orientation of the aperture is determined as shown in FIG. 7. This is done by moving the laser beam from point D across the aperture assembly until the digital camera detects the laser beam and generates an initialization signal for point E, which corresponds to passage of the light through the aperture 43. This allows location of one of the edges of the aperture 43. Upon receiving the initialization signal, initialization coordinate information is stored. The laser cutting tool is then moved to point F, where the searching procedure is repeated a second time to find a second point G along the same edge of the aperture 43. The two points E and G and the plane in space allow calculation of point H at the center of the edge of the aperture 43.

Figure 8:
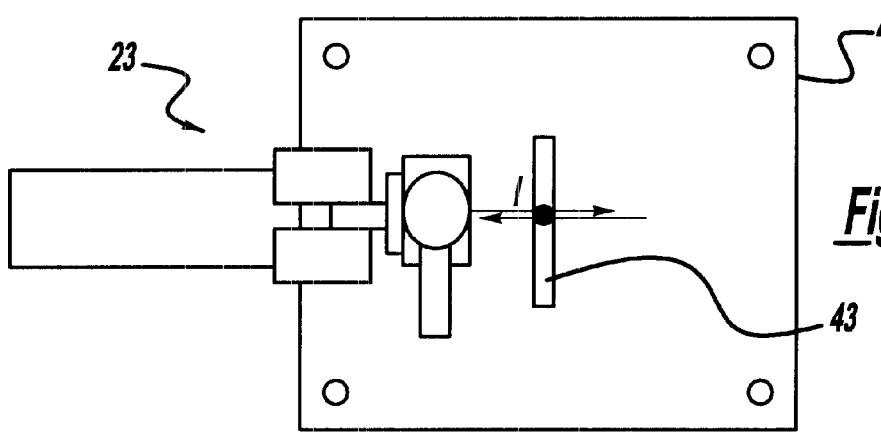
FIG. 8 is a plan view of an aperture demonstrating a process for oscillating a beam cutting tool across an aperture assembly for a first tool orientation.

Returning now to FIG. 5, it can be seen that at step 120 the tool is oscillated across the aperture assembly such that light from the tool periodically passes through the aperture assembly. This is preferably done four to eight times so that center point coordinate information can be determined at step 130 with a large enough sampling. It is also important to note that this is done for a given tool orientation. For example, the orientation shown in FIG. 8 is zero degrees with respect to perpendicularity of the tool 23. Returning now to FIG. 5, it can be seen that at step 140, the TCP is calculated for the current tool orientation based on the center point coordinate information. This is preferably done by simply averaging the center point coordinate information. The result is point I representing the first estimate for the TCP.

Figure 9:
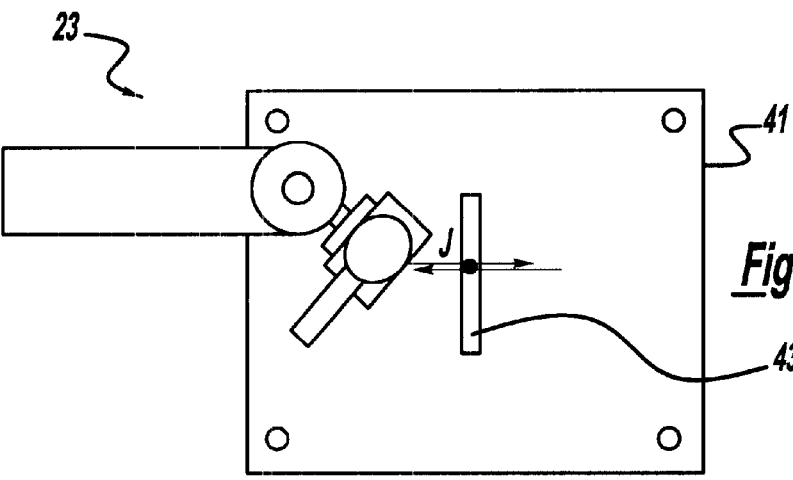
FIG. 9 is a plan view of an aperture demonstrating a process for oscillating a beam cutting tool across an aperture assembly for a second tool orientation.
Figure 10:
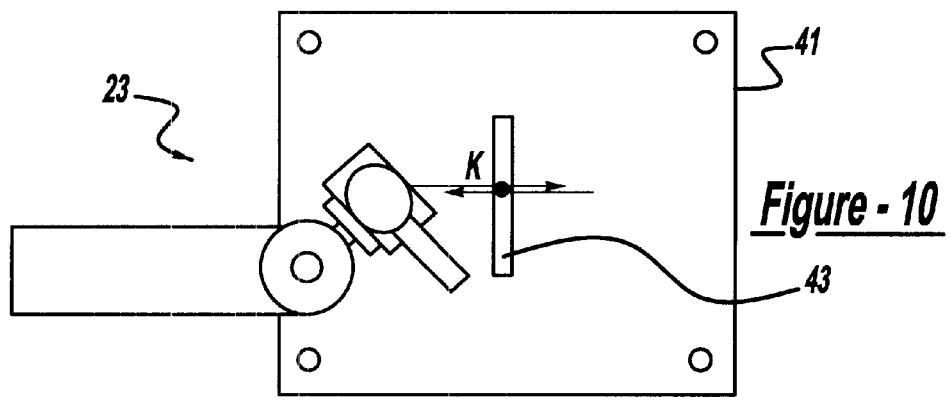
FIG. 10 is a plan view of an aperture demonstrating a process for oscillating abeam cutting tool across an aperture assembly for a third tool orientation.
Figure 11:
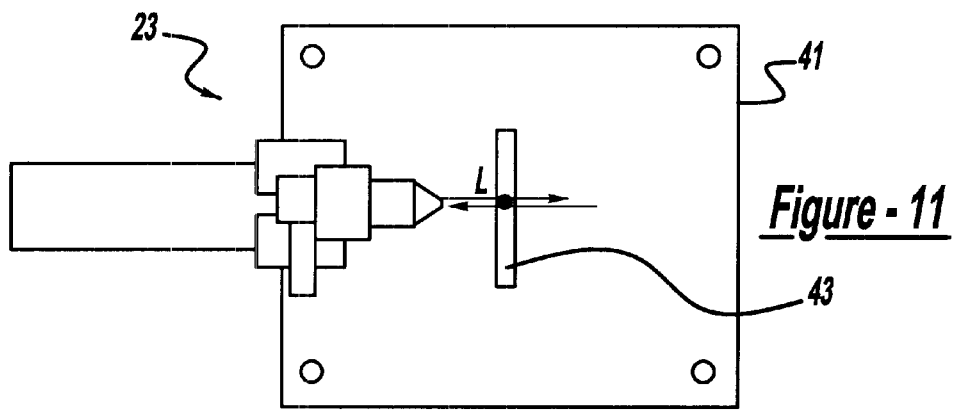
FIG. 11 is a plan view of an aperture demonstrating a process for oscillating a beam cutting tool across an aperture assembly for a fourth tool orientation.

Returning once again to FIG. 5, it can be seen that the present invention provides for repeating the oscillating, determining, and calculating steps 120, 130, 140 for a plurality of tool orientations at steps 150 and 152. For example, as shown in FIG. 9, after point I is calculated, the beam tool can be turned to a +45° angle (around the center axis of the beam) from the original orientation. The result is point J. Turning now to FIG. 10, it can be seen that the laser cutting tool is turned to a −45° angle (around the center axis of the laser beam) from the original orientation. This orientation results in point K. FIG. 11 shows the determination of point L by tilting the beam tool 30° around the Y-axis and executing the above steps. Using the points I, J, K, L and the tool orientations, step 140 provides a TCP offset for calibration of the tool by effectively calculating the difference between the actual TCPs and the correct one. Step 160 can be performed using any number of functions and techniques known in the art, because the input used is identical to that of conventional approaches. Thus, the present invention provides a unique method and system for determining TCPs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for determining a tool center point for a beam tool, the method comprising the steps of:

oscillating the tool across an aperture assembly such that light from the tool periodically passes through the aperture assembly;

determining center point coordinate information based on passage of the light through the aperture assembly; and calculating the tool center point based on the center point coordinate information.

2. The method of claim 1 further including the steps of:

repeating the oscillating, determining, and calculating steps for a plurality of tool orientations; and calibrating the tool based on the tool center points and the tool orientations.

3. The method of claim 1 further including the step of automatically determining location information regarding the aperture assembly.

4. The method of claim 3 further including the step of automatically locating a plane containing the aperture assembly.

5. The method of claim 4 further including the steps of:

locating three points in the plane containing the aperture assembly; and calculating an orientation for the plane containing the aperture assembly based on locations of the three points.

6. The method of claim 4 further including the step of automatically determining an orientation of an aperture contained within the aperture assembly.

7. The method of claim 6 further including the steps of:

locating a first point on an edge of the aperture;

locating a second point on the edge of the aperture; and calculating an orientation of the aperture based on locations of the edges.

8. The method of claim 7 further including the steps of:

receiving an initialization signal corresponding to passage of the light through the aperture; and storing initialization coordinate information based on the initialization signal, the initialization coordinate information defining the locations of the edges.

9. The method of claim 1 further including the steps of:

receiving center point signals corresponding to passage of the light through the aperture; and storing the center point coordinate information based on the center point signals.

10. The method of claim 1 further including the step of averaging the center point coordinate information.

11. A calibration system for determining a tool center point for a laser beam cutting tool, the system comprising;

an aperture assembly having an aperture for allowing light from the laser cutting tool to pass from a first side of the aperture assembly to a second side of the aperture assembly;

a light sensing device for capturing an image of the second side of the aperture assembly and for generating a signal corresponding to passage of the light to the second side of the aperture assembly;

means for oscillating the laser cutting tool such that light from the tool periodically passes through the aperture assembly; and means for determining center point coordinate information based on signals generated by the light sensing device and for calculating the tool center point based on the coordinate information.

12. The calibration system of claim 11 wherein the aperture assembly further includes:

a first plate containing the aperture; and a second plate disposed between the first plate and the laser cutting tool, the second plate being semitransparent with respect to the light.

13. The calibration system of claim 12 wherein the first plate includes sheet metal.

14. The calibration system of claim 12 wherein the aperture assembly further includes a protective layer of film disposed between the second plate and the laser cutting tool such that the film provides protection to the second plate.

15. The calibration system of claim 11 wherein the light sensing device generates the signal when an illumination intensity on the second side of the aperture assembly meets a predetermined condition.

16. The calibration system of claim 11 further including:

a housing enclosing the light sensing device. the housing having an opening; and a connection mechanism for coupling the aperture assembly to the opening of the housing.

17. The calibration system of claim 16 wherein the housing includes sheet metal.

* * * * *